Nov. 3, 1925.

T. OLINGER 1,559,768

SHEET METAL AND SCREW CONNECTING MEANS

Filed Sept. 28, 1922

Inventor
Thomas Olinger
By Frank E. Liverance, Jr.
Attorney.

Patented Nov. 3, 1925.

1,559,768

UNITED STATES PATENT OFFICE.

THOMAS OLINGER, OF HOLLAND, MICHIGAN, ASSIGNOR, BY MESNE ASSIGNMENTS, TO FEDERAL MANUFACTURING COMPANY, OF HOLLAND, MICHIGAN, A CORPORATION OF MICHIGAN.

SHEET-METAL AND SCREW CONNECTING MEANS.

Application filed September 28, 1922. Serial No. 591,196.

*To all whom it may concern:*

Be it known that I, THOMAS OLINGER, a citizen of the United States of America, residing at Holland, in the county of Ottawa and State of Michigan, have invented certain new and useful Improvements in Sheet-Metal and Screw Connecting Means; and I do hereby declare the following to be a full, clear, and exact description of the invention, such as will enable others skilled in the art to which it appertains to make and use the same.

This invention relates to a means for connecting sheet metal housing parts to a screw support therefor, being of utility when used with small pulleys, such as are used for carrying furnace chains, awning ropes and the like. It is an object and purpose of the present invention to provide a simple and novel means of this character wherein a screw support adapted to be inserted in a wood support, such as a joist or post in the basement of a house or a window casing, may be permanently and securely connected with a sheet metal housing for pulleys, or other devices. A further object is to make a connection of this character, comprising a sheet metal clip which is clinched over and around the head of a screw and covering portions of the housing which enclose and cover said head, the construction being economically produced and with rapidity whereby quantity production is readily attained. These and other objects and purposes, together with novel constructions for attaining the same will be apparent as understanding of the invention is had from the following description, taken in connection with the accompanying drawing showing a preferred embodiment of the invention, in which drawing, Fig. 1 is a perspective view of a pulley equipped with my invention.

Like reference characters refer to like parts in the several figures of the drawing.

Figure 2:
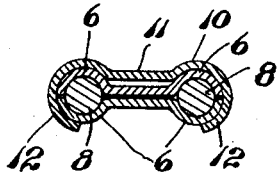
Fig. 2 is a horizontal section taken on the plane of line 2—2, of Fig. 1.
Figure 1:
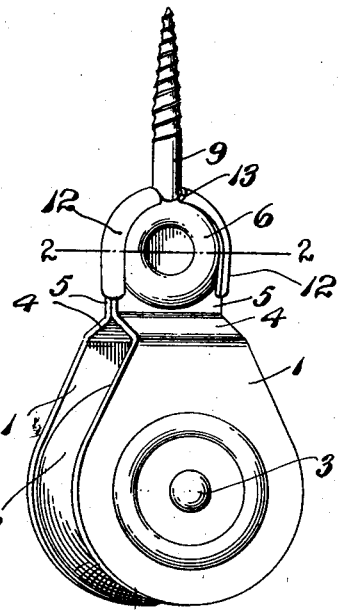
Figure 3:
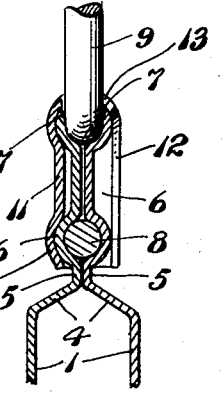
Fig. 3 is a fragmentary vertical section through the upper part of the construction shown in Fig. 1.

The pulley housing includes two spaced apart sides 1 between which the pulley 2, of any preferred construction is rotatably mounted as on a pin 3 or any other preferred form of mounting the pulley may be used. Adjacent their upper ends the sides are bent inwardly and upwardly toward each other, as indicated at 4, coming into contact engagement with each other and thence continuing vertically as ears 5, each of which is embossed to make circular outwardly projecting embossings 6 having concaved inner sides for the reception of an eye on the screw eye used, as will hereafter appear. At the upper side of each embossing 6, a semi-circular notch 7 is cut for passage of the shank of the screw eye.

The screw eye is formed from wire or small rod stock, having a circular eye 8 at one end from which a shank 9 extends, the shank being threaded at its outer portion to form a wood screw, though the character of the screw formation used is not material in any way to the invention. In fact any suitable means whereby the shank 9 may be attached or connected to a support may be used without affecting the invention.

The eye 8 is placed between the two embossings 6 of the ears 5, and the same are secured by a sheet metal clip comprising a back 10 having an intermediate portion 11 pressed inwardly to enter the recess within one of the embossings 6 on the outer side of one of the ears 5, and being further provided with sides or flanges 12 projecting at right angles, substantially from the upper and side edges of the back 10. This flange 12 at its upper side is cut away to leave a relatively large recess or notch 13 so that the clip may be placed against one of the ears 5, at the outer side thereof, and the shank 9 of the screw passes into the recess at 13.

After placing in such position, the edges of the flanges 12 of the clip are pressed inwardly and clinched against the opposite embossing 6 and partly around the shank 9 of the screw, permanently and securely clamping the two ears 5 and the eye 8 together.

Figure 8:
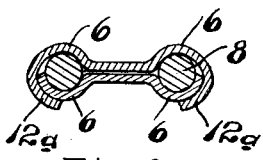
Fig. 8 is a horizontal section, similar to that shown in Fig. 2, illustrating a modification in construction.
Figure 4:
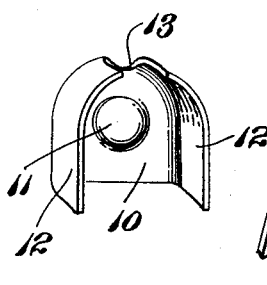
Fig. 4 is a perspective view of the clip used.
Figure 5:
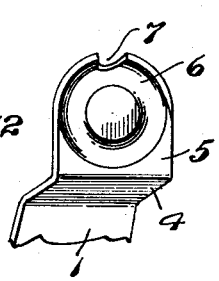
Fig. 5 is a perspective view of the inner side and upper end of one of the sides of the pulley housing.
Figure 6:
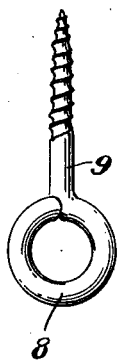
Fig. 6 is a perspective view of the screw preferably used.
Figure 7:
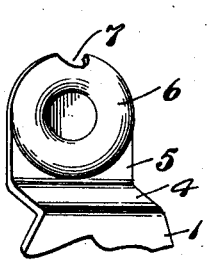
Fig. 7 is a perspective view, similar to Fig. 5, but showing the opposite outer side of the upper end of one of the sides of the pulley housing.

In Fig. 8, the clip used to connect the two sides together is dispensed with, one of the ears 5 being formed with an embossing 6, like that previously described while the other has the metal continued at its edges so that it may be clinched around the first embossing, as indicated at 12ᵃ in said Fig. 8. This makes a firm and secure connection, the clip in this instance being in fact formed as an integral part of one of the ear portions of the housing parts, as is evident.

This construction is simple in manufacture and construction, is economical to produce and is durable and effective in use. The screw may be readily inserted into any suitable wood support where the pulley is to be used and the connection of the screw to the pulley housing is strong and capable of withstanding any strain to which it may be subjected in service. The appended claims define the invention and it is to be considered that the invention comprehends all forms of structure coming within their scope.

I claim:

1. In a construction of the class described, a housing having two sides formed at their upper ends with ears located side by side and in contact with each other, said ears each having an embossing pressed therein of circular form, a shank threaded at its outer end and formed with a circular eye at its inner end, said eye being located between the ears and received in said embossings, and a sheet metal clip located against and wholly covering the outer side of one of said ears and having flanges extending over the meeting edges of the ears and clinched against the other ear to permanently secure the ears, clip and eye together.

2. In a construction of the class described, two pieces of sheet metal located side by side and in contact with each other, said pieces each having a recess pressed therein at its inner side, a shank having a head thereon, the head being seated in said recesses between the pieces of sheet metal and the shank extending outwardly therefrom, and a flat sheet metal clip located against the outer side of one of said pieces and formed with edge flanges extending to and clinched against the other piece of sheet metal, thereby securing the pieces of sheet metal, head and clip together.

3. In a construction of the character described, two pieces of sheet metal each having concave depressions, a shank having a head, the head being located between said pieces of sheet metal and in said depressions, and a clip embracing the outer edges of said sheet metal pieces to inseparably connect the same and retain the head of said shank between them.

4. A construction of the character described, a pulley housing comprising two sides of metal having their upper ends bent toward each other to lie in contiguous relation, each of said ends having a concave circular depression on its inner side, a shank formed at one end with a circular eye, said eye being received in said depressions and said shank extending outwardly therefrom, and a clip partially surrounding said ends and embracing the outer edges thereof to inseparably hold the ends together and retain the eye between them.

In testimony whereof I affix my signature.

THOMAS OLINGER.